United States Patent
Yu et al.

(10) Patent No.: US 9,906,143 B1
(45) Date of Patent: Feb. 27, 2018

(54) SYSTEMS AND METHODS FOR DIAGNOSTIC CURRENT SHUNT AND OVERCURRENT PROTECTION (OCP) FOR POWER SUPPLIES

(71) Applicant: Dell Products L.P., Round Rock, TX (US)

(72) Inventors: Wei Cheng Yu, New Taipei (TW); Tsung Cheng Liao, Taoyuan (TW); Merle Wood, Round Rock, TX (US); Geroncio O. Tan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/282,189

(22) Filed: Sep. 30, 2016

(51) Int. Cl.
  *H02M 3/335* (2006.01)
  *H02M 1/08* (2006.01)
  *H02H 7/12* (2006.01)
  *H02H 11/00* (2006.01)
  *H02H 3/087* (2006.01)
  *H02M 1/00* (2006.01)

(52) U.S. Cl.
  CPC ........ *H02M 3/33507* (2013.01); *H02H 3/087* (2013.01); *H02H 7/1213* (2013.01); *H02H 11/007* (2013.01); *H02M 1/08* (2013.01); *H02M 2001/0009* (2013.01)

(58) Field of Classification Search
  CPC ............. H02M 3/335; H02M 3/33507; H02M 2001/0009

USPC .............. 363/21.01, 21.04–21.18, 52–56.05, 363/125–127
See application file for complete search history.

(56) References Cited

U.S. PATENT DOCUMENTS

| | | | |
|---|---|---|---|
| 9,729,062 B2* | 8/2017 | Cummings | H02M 3/335 |
| 2004/0080293 A1* | 4/2004 | Kurosawa | H02P 6/182 318/400.11 |
| 2004/0183510 A1* | 9/2004 | Sutardja | H02M 1/088 323/266 |
| 2007/0133234 A1* | 6/2007 | Huynh | H02M 3/33507 363/20 |
| 2008/0290846 A1* | 11/2008 | Kanouda | H02M 1/4225 323/222 |
| 2009/0086517 A1* | 4/2009 | Wei | H02M 3/156 363/50 |
| 2015/0143150 A1 | 5/2015 | Verdun | |
| 2015/0318685 A1 | 11/2015 | Hsieh et al. | |

* cited by examiner

*Primary Examiner* — Adolf Berhane
*Assistant Examiner* — Nusrat Quddus
(74) *Attorney, Agent, or Firm* — Egan Peterman Enders Huston

(57) ABSTRACT

Systems and methods are provided that may be implemented to provide a power supply with automatic overcurrent protection (OCP) point calibration and/or current sense resistor (Rsense) verification. The provided systems and methods may implement auto-calibration techniques on the secondary side of a power supply to achieve a more precise OCP point than is possible with conventional adapter technology, and in one example may implement auto trimming for OCP voltage threshold value.

20 Claims, 11 Drawing Sheets

SYSTEMS AND METHODS FOR DIAGNOSTIC CURRENT SHUNT AND OVERCURRENT PROTECTION (OCP) FOR POWER SUPPLIES

FIELD OF THE INVENTION

This invention relates generally to power supplies and, more particularly, to overcurrent protection (OCP) for AC adapters.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Underwriters Laboratories (UL) 60950-1 Standard for Safety requires that all systems accepting power greater than allowed under Section 2.5 Limited Power Sources (LPS) shall have two steps of independent fault protection. These fault protection circuits add design complexity, board space, and cost. For a system to be consider LPS compliant and exempt from the overcurrent protection (OCP), output current cannot exceed 8 amperes for less than or equal to 30 volts output, and output apparent power cannot exceed 100 volt-amperes (VA). For example, maximum output power of a 90 Watt AC adapter having a 20 Volt output can potentially exceed 100 VA considering a worst case tolerance. In this example, output power needs to be under 100 VA=VO (no load). With the introduction USB Type C, maximum rated adapter power can be as high as 100 W.

In the traditional 90 Watt adapter design, it is not possible to meet the above mentioned LPS limits due to tight output tolerance requirement. FIG. 1A illustrates a diagram of primary side circuitry 190 of a conventional AC adapter that utilizes total power detection on the primary side to monitor the output power. Comparator 100 output goes high when the PWM driving signal is high, and this signal is inverted at the input to the NOR 103a causing its output to go high and turn ON the upper NPN transistor 104a of the push-pull circuit 104, which in turn turns ON MOSFET transistor Q1 105 and connects the primary coil 112 of the transformer to ground. A comparator 101 monitors the voltage drop across sense resistor Rsense 106. Comparator 101 trips if the voltage exceeds a predetermined threshold (Vth) and sets the latch 102. Latch 102 then turns ON the lower NPN transistor 104b of the push-pull circuit 104 which in turn overrides the PWM control and forces the gate voltage to transistor Q1 105 low, thus disabling the AC adapter. Although this simple circuit 190 works, its accuracy is poor due to high component tolerances.

Empirical data show tolerance of a conventional 90 Watt AC adapter exceeds 10 Watts and is therefore unable to meet the LPS safety limit of ≤100 VA. Existing 90 Watt adapters cannot meet LPS requirement due to electronic components tolerance deviation that results in a very large range on the OCP point. Thus output power of conventional AC adapters are typically undersized to cover electronic component tolerance deviation, e.g., such as downsizing a 90 Watt adapter design to be 85 Watts to gain more room to cover electronic tolerance range. However, such intentional adapter power undersizing to meet the 100 VA limit penalizes the adapter capability and impacts backward adapter compatibility.

Conventional LPS designs are also known that support single output voltage by using independent OCP circuits such as a primary side OP-Amp and current sensing resistor. However, such designs are not able to provide a very precise OCP point due to electronic components tolerance deviation and therefore cannot meet the LPS request. Type C adapters are typically design to support multiple output voltage levels (at same maximum power). Therefore, the OCP circuit must comprehend the negotiated power contract and set the corresponding trip point for that particular output voltage level.

As shown in FIG. 1B, it is known to use a secondary-side sense resistor placed in series in the ground return path from a power-consuming computer system load to a secondary-side transformer coil of an AC adapter. It is also known to provide an AC adapter with a secondary-side microcontroller (MCU) having an op amp comparator coupled to detect voltage drop the sense resistor while current is supplied from the AC adapter to the system load. In such a conventional configuration, a digital core of the MCU compares the measured voltage drop to a voltage threshold (Vth) that corresponds to the OCP point. If this measured voltage drop exceeds the Vth, then the MCU digital core shuts down the adapter by shutting down (or turning "OFF") an output protection switch placed in the output power path from the secondary side of the AC adapter. As shown, an optocoupler is also present for purposes of detecting and providing a secondary side output voltage feedback to a primary-side PWM integrated circuit (IC) of the AC adapter.

SUMMARY OF THE INVENTION

Disclosed herein are systems and methods that may be implemented to provide a power supply, such as an AC/DC adapter, with automatic and/or programmable overcurrent protection (OCP) point calibration and/or current sense resistor (Rsense) verification. In one exemplary embodiment, such auto OCP point calibration and Rsense verification may be implemented for power supply unit (PSU) protection in a manner that complies with the UL 60950-1 Standard for Safety Limited Power Source (LPS) for adapters that support variable output voltage applications such as USB Power Delivery (USB PD) or that support a single output voltage. The disclosed systems and methods may be advantageously implemented in one embodiment to ensure LPS standard compliance and LPS protection without undersizing a power supply design under conditions of mass production of information handling systems, where electronic component tolerance deviation would otherwise require downsizing the power capability of the power supply design.

In various embodiments, the disclosed systems and methods may be implemented in a manner to achieve one or more of the following benefits over conventional power supply design. For example, the disclosed systems and methods may be implemented for an external power supply (e.g., such as an external AC/DC adapter) with relatively simple circuitry to meet the UL LPS standard in a safety single fault environment while saving cost. As such the disclosed systems and methods may be implemented in a manner that saves system fabrication cost since it does not require use of flammable plastic material that houses a LPS circuit. In another example, the UL LPS safety requirements may be met for an external power supply at variable output voltage and at a relatively very narrow output power range in a manner that is not possible with conventional adapter design, e.g., so as to allow a true 90 Watt power output adapter to be provided without risk of exceeding the 100 VA UL LPS safety limit. In yet another example, current sense resistor (Rsense) verification may be integrated into a power supply to identify an incorrectly-sized or defective current sense resistor (e.g., such as identification of a faulty or incorrect Rsense value) so as to enhance power supply reliability. In this regard, identification of Rsense resistance value may be used, for example, to check safe operation at a single fault condition. In a further example, functionality of the disclosed systems and methods may be combined or integrated with a power delivery (PD) application specific integrated circuit (ASIC) to realize further cost savings. Moreover, the disclosed systems and methods may be implemented with any power supply unit (PSU) topology, such as forward converter/fly-back converter, etc.

In one embodiment, the disclosed systems and methods may implement auto-calibration techniques on the secondary side of a power supply to achieve a more precise OCP point than is possible with conventional adapter technology. This is in contrast to conventional LPS designs that support single output voltage by using independent OCP circuits such as a primary side OP-Amp and current sensing resistor. Moreover, the disclosed systems and methods may be implemented to comply with LPS (Limit power source) standard when doing safety single fault without relying on primary side pulse width modulation (PWM) integrated circuit (IC) to perform rough tolerance OPP that may not be capable of meeting this standard. In one exemplary embodiment, auto trimming for OCP voltage threshold (Vth_OCP) may be performed. In yet another embodiment, the disclosed systems and methods may be configured to implement a digitally controlled power supply (e.g., such as a Type C power adapter) having multiple different output voltage levels using programmable overcurrent protection (OCP) point calibration and/or current sense resistor (Rsense) verification to support multiple different power profiles.

In one respect, disclosed herein is a power supply unit (PSU) including a primary side and a secondary side that are separated by a transformer. The PSU may include: transformer circuitry having a primary side winding and a secondary side winding; primary side circuitry including the primary side winding of the transformer and configured to receive input power at a PSU power input; secondary side circuitry including the secondary side winding of the transformer coupled to a DC output current loop that includes first and second DC current loop paths, the secondary side circuitry configured to receive power from the primary side circuitry through the transformer and to supply direct current (DC) power to a PSU power output through the DC current loop paths of the DC output current loop; an output power switch coupled within the DC output current loop between the transformer and the PSU power output, the output power switch being coupled to selectively connect and disconnect the PSU power output from the transformer; a sense resistor coupled within one of the first or second DC current loop paths between the transformer and the output power switch; at least one current shunt coupled between the first and second DC current loop paths at a node located between the sense resistor and the output power switch to provide a test current path through the current shunt and the DC current loop with the PSU power output disconnected from the transformer by the output power switch, the current shunt having a resistance value selected to yield an expected test current value through the current shunt and the DC current loop at a given output voltage from the transformer; and at least one programmable integrated circuit coupled to control the output power switch and programmed to selectively disconnect the PSU power output from the transformer while the secondary side of the transformer is supply DC power to produce a test current through the test current path and to monitor a voltage drop across the sense resistor while the test current is flowing across the sense resistor with the PSU power output being disconnected from the transformer by the output power switch. The programmable integrated circuit may be further programmed to: compare the expected voltage drop to the monitored voltage drop across the sense resistor while the test current is flowing across the sense resistor, and determine whether or not to control the output power switch to connect the PSU power output to the transformer based on the comparison of the monitored voltage drop across the sense resistor to the expected voltage drop across the sense resistor.

In another respect, disclosed herein is a power supply unit (PSU) including a primary side and a secondary side that are separated by a transformer. The PSU may include: transformer circuitry having a primary side winding and a secondary side winding; primary side circuitry including the primary side winding of the transformer and configured to receive input power at a PSU power input; secondary side circuitry including the secondary side winding of the transformer coupled to a DC output current loop that includes first and second DC current loop paths, the secondary side circuitry configured to receive power from the primary side circuitry through the transformer and to supply direct current (DC) power to a PSU power output and a power-consuming load through the DC current loop paths of the DC output current loop; an output power switch coupled within the DC output current loop between the transformer and the PSU power output, the output power switch being coupled to selectively connect and disconnect the PSU power output from the transformer; a sense resistor coupled within one of the first or second DC current loop paths between the transformer and the output power switch; and at least one programmable integrated circuit. The at least one programmable integrated circuit may be programmed to: control the PSU to supply DC output power through the DC current loop to the PSU power output with the PSU power output being connected to the transformer by the output power switch, monitor the DC output power supplied through the DC current loop to the PSU power output and determine an expected voltage drop across the sense resistor that corresponds to a value of the monitored DC output power, monitor a voltage drop across the sense resistor while the monitored DC output power is supplied through the DC current loop to the PSU power output, compare the expected voltage drop to the monitored voltage drop across the sense resistor while the monitored DC output power is supplied through the DC current loop to the PSU power output, control the output power switch to disconnect the PSU power output to the transformer if the monitored voltage drop does not equal the expected voltage drop, and control the output power switch to maintain the PSU power output connected to the transformer if the monitored voltage drop equals the expected voltage drop.

In another respect, disclosed herein is a method of operating a power supply unit (PSU) system including primary side circuitry and secondary side circuitry that are separated by a transformer. The method may include: receiving a power input in the primary side circuitry of the PSU, the primary side circuitry of the PSU including a primary side winding of the transformer; receiving power in the secondary side circuitry from the primary side circuitry, the secondary side circuitry including the secondary side winding of the transformer coupled to a DC output current loop that includes first and second DC current loop paths and an output power switch coupled within the DC output current loop between the transformer and a PSU power output; and using at least one programmable integrated circuit to control the output power switch coupled within the DC output current loop between the transformer and the PSU power output to selectively connect and disconnect the PSU power output from the transformer; using at least one programmable integrated circuit to monitor a voltage drop across a sense resistor coupled within one of the first or second DC current loop paths between the transformer and the output power switch while a test current is flowing across the sense resistor that is produced through a test current path that includes the DC current loop and at least one current shunt coupled between the first and second DC current loop paths at a node located between the sense resistor and the output power switch while the PSU power output is selectively disconnected from the transformer by the output power switch, the current shunt having a resistance value selected to yield an expected test current value through the current shunt and the DC current loop at a given output voltage from the transformer; and using the at least one programmed integrated circuit to compare the expected voltage drop to the monitored voltage drop across the sense resistor while the test current is flowing across the sense resistor, and determine whether or not to control the output power switch to connect the PSU power output to the transformer based on the comparison of the monitored voltage drop across the sense resistor to the expected voltage drop across the sense resistor.

In another respect, disclosed herein is a method of operating a power supply unit (PSU) system including primary side circuitry and secondary side circuitry that are separated by a transformer. The method may include: receiving a power input in the primary side circuitry of the PSU, the primary side circuitry of the PSU including a primary side winding of the transformer; receiving power in the secondary side circuitry from the primary side circuitry, the secondary side circuitry including the secondary side winding of the transformer coupled to a DC output current loop that includes first and second DC current loop paths and an output power switch coupled within the DC output current loop between the transformer and a PSU power output; using at least one programmable integrated circuit to control the output power switch coupled within the DC output current loop between the transformer and the PSU power output to selectively connect and disconnect the PSU power output from the transformer; using at least one programmable integrated circuit to monitor a voltage drop across a sense resistor coupled within one of the first or second DC current loop paths between the transformer and the output power switch while controlling the PSU to supply a DC output power through the DC current loop to the PSU power output while the PSU power output is selectively connected to the transformer by the output power switch; and using the at least one programmed integrated circuit to: monitor the DC output power supplied through the DC current loop to the PSU power output and determine an expected voltage drop across the sense resistor that corresponds to a value of the monitored DC output power, monitor a voltage drop across the sense resistor while the monitored DC output power is supplied through the DC current loop to the PSU power output, compare the expected voltage drop to the monitored voltage drop across the sense resistor while the monitored DC output power is supplied through the DC current loop to the PSU power output, control the output power switch to disconnect the PSU power output to the transformer if the monitored voltage drop does not equal the expected voltage drop, and control the output power switch to maintain the PSU power output connected to the transformer if the monitored voltage drop equals the expected voltage drop.

DESCRIPTION OF ILLUSTRATIVE EMBODIMENTS

Figure 1A:
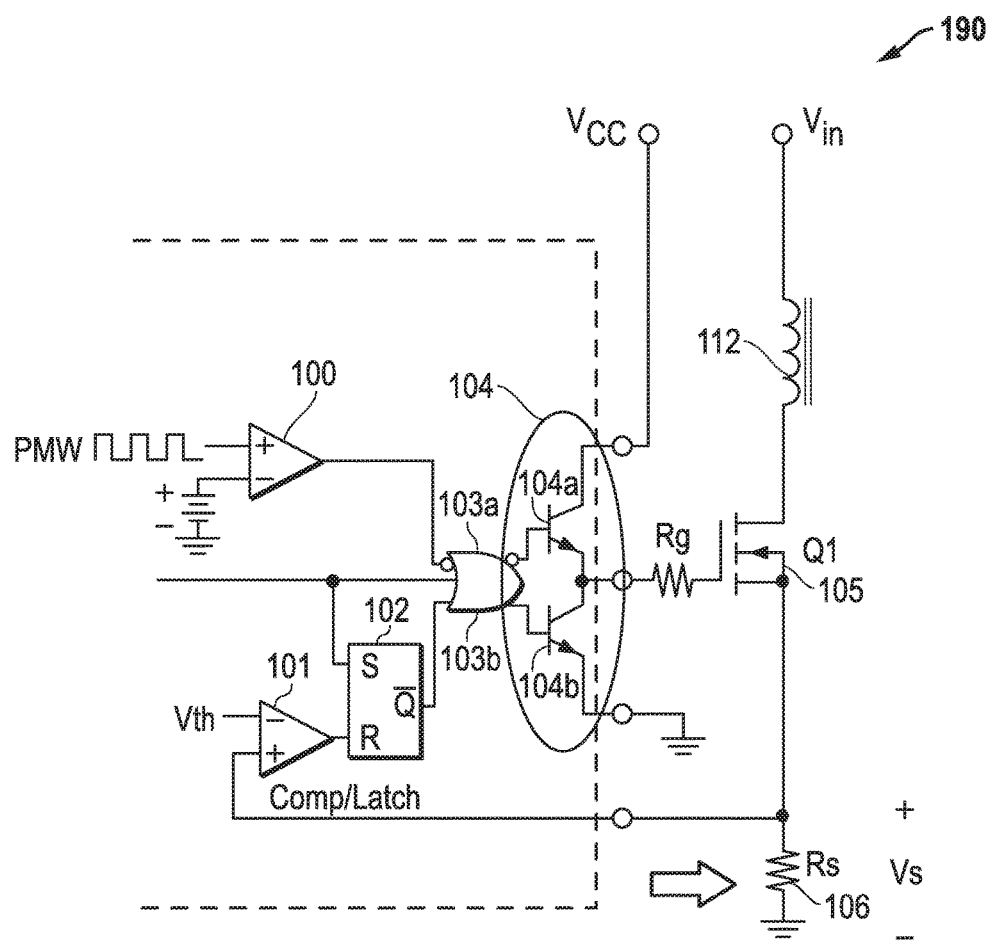
FIG. 1A is a block diagram illustrating primary side circuitry of a conventional AC adapter.
Figure 1B:
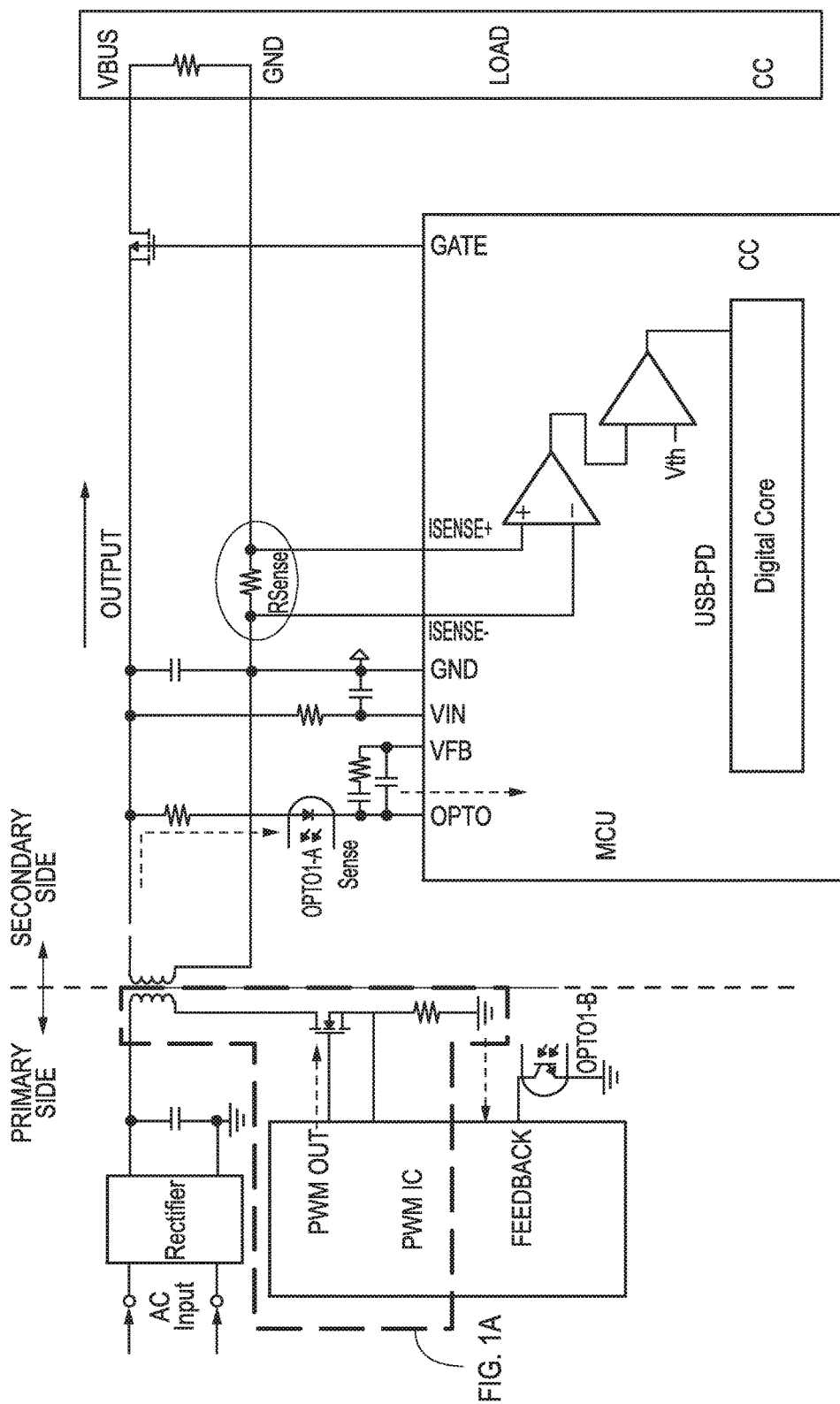
FIG. 1B is a block diagram illustrating a conventional AC adapter.
Figure 2:
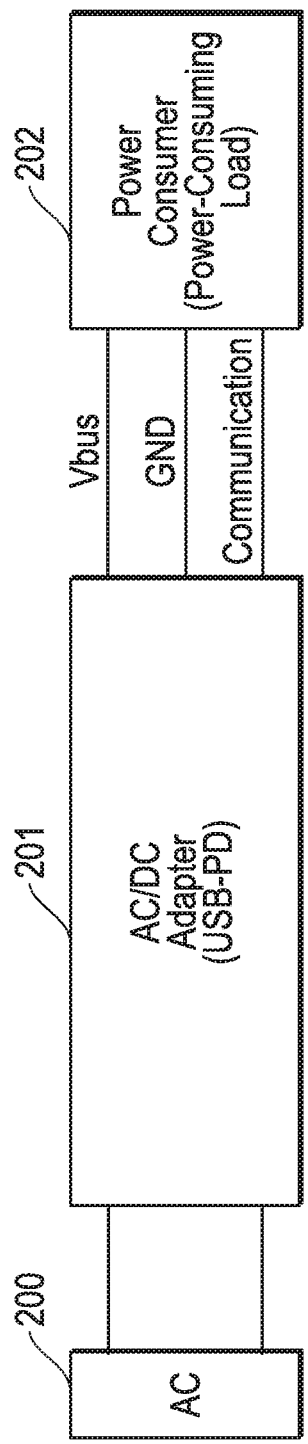
FIG. 2 is a block diagram illustrating an external power supply coupled between AC mains source and a system load according to one exemplary embodiment of the disclosed systems and methods.

FIG. 2 illustrates an external power supply 201 configured as an AC/DC adapter that is coupled between AC mains source 200 and a power-consuming load that may, for example, include power-consuming circuitry of an information handling system 202, e.g., battery-powered portable information handling system such as notebook computer, tablet computer, convertible laptop computer, smart phone, etc. In this exemplary embodiment, AC/DC adapter 201 is configured with USB power delivery (PD) capability, and is coupled to supply power to a power-consuming system load (e.g., including power-consuming circuitry) of information handling system 202 across a voltage bus (Vbus) to ground as shown. However, it will be understood that types of power supplies other than USB-enabled power supplies maybe configured with the overcurrent protection (OCP) point calibration and/or current sense resistor (Rsense) verification features described herein. Further, a power supply may be configured to provide power to any other type of power-consuming load that takes power from the power supply, e.g., such as peripherals, speakers, light elements such as LEDs, DC motors, radio transmitters receivers or transceivers, etc.

In one exemplary embodiment, power supply 201 may be a 90 Watt AC adapter having a 20 Volt output and a maximum output power of 100 VA. However, the disclosed systems and methods may be implemented with other power supplies having greater or lesser power ratings (e.g., greater than 90 Watt or less than 90 Watt ratings), and/or with other types of power supplies besides AC/DC adapters. Further exemplary information on power supplies and system loads may be found in United States Patent Application Publication No. 2015/0318685 and United States Patent Application Publication No. 2015/0143150, each of which is incorporated herein by reference in its entirety for all purposes.

Figure 3A:
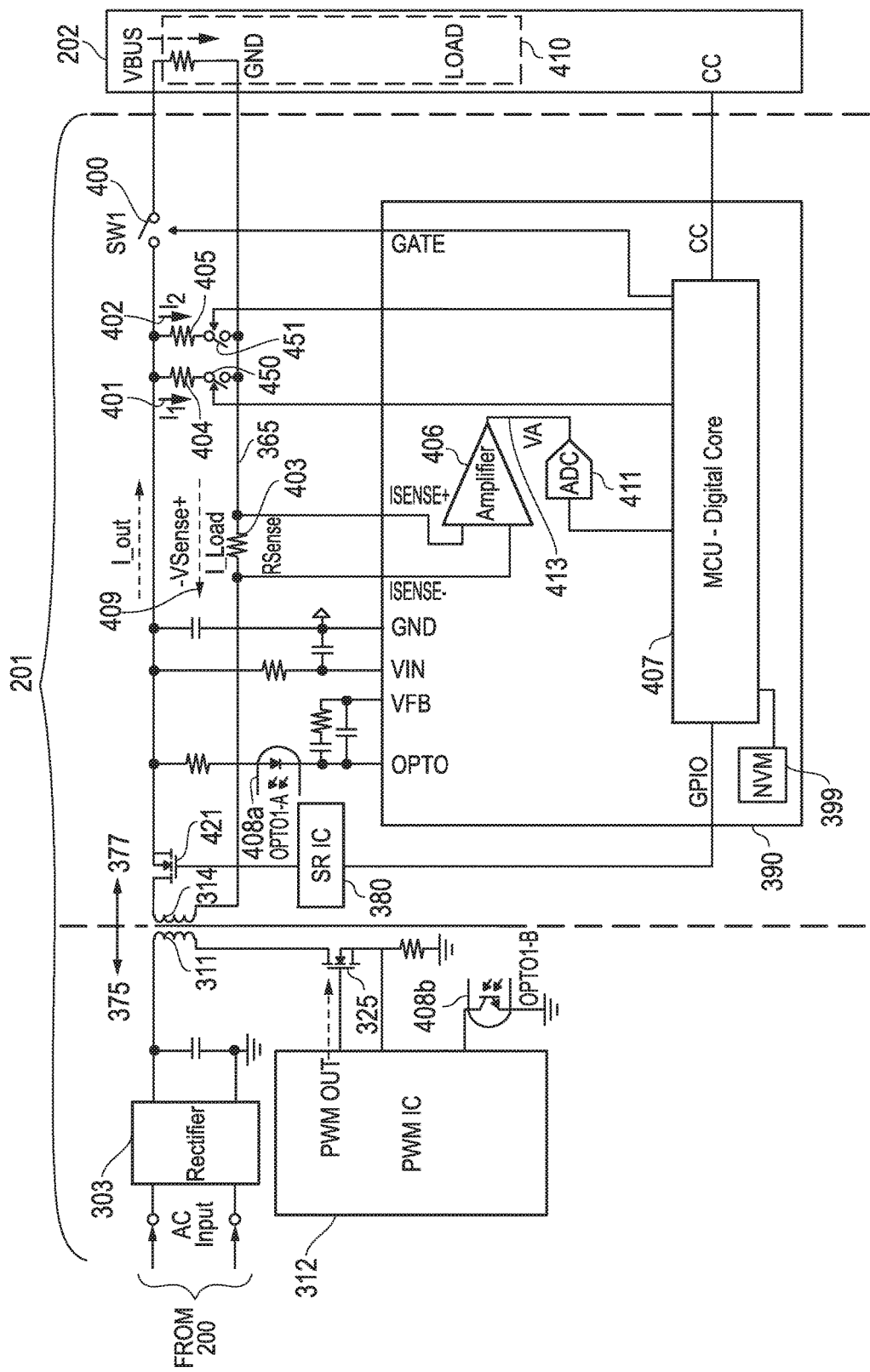
FIG. 3A illustrates a simplified circuit diagram of a power supply according to one exemplary embodiment of the disclosed systems and methods.

FIG. 3A illustrates a circuit diagram of power supply 201 that includes a primary side circuitry 375 that includes rectifier 303 coupled to receive AC mains power 200 and perform AC to DC conversion, and a secondary side circuitry 377 that includes a power output to an information handling system 202. As shown, rectifier 303 is coupled to main transformer primary coil 311 of primary side circuitry 375 which is inductively coupled to main transformer secondary coil 314 of secondary side circuitry 377 for voltage reduction. As further shown, primary side circuitry 375 of power supply 201 also includes a pulse width modulation (PWM) integrated circuit that is coupled to provide PWM output signal to control on and off state of primary side switch 325 and thus control output power of secondary side of power supply 201 by controlling a duty cycle of the on/off state of switch 325.

In the embodiment of FIG. 3A, DC output current is supplied from the secondary coil 314 through secondary side output protection switch (e.g., blocking MOSFET) 400 as shown to Vbus of information handling system 202 for powering a system load 410 of the information handling system 202. Power-consuming components of system load 410 may include, for example, programmable integrated circuits (such as controllers, microcontrollers, etc.), volatile and/or non-volatile memory (e.g., including DRAM, NVRAM, Flash memory, etc.), video display components, lighting elements (e.g., such as LEDs, LCDs, etc.), cooling fans, amplifiers, radio transceivers, etc. Secondary side circuitry 377 of power supply 201 also includes a secondary side microcontroller 390 having a digital core 407 that is coupled to control the state of output protection switch 400, i.e., to selectively enable and disable DC power output from power supply 201 to Vbus. In this exemplary embodiment, programmable MCU digital core 407 is also coupled to Synchronized Rectifier integrated circuit (SR IC) 380 which is in turn coupled to control ON/OFF state duty cycle of secondary side Metal-Oxide Semiconductor Field-Effect Transistor (MOSFET) 421. SR IC 380 is configured to feed back the real time duty cycle of MOSFET 421 to MCU digital core 407 such that MCU digital core 407 may monitor real time duty cycle of power supply 201.

An optocoupler circuit 408 (illustrated as 408a in optical communication with 408b in FIG. 3A) may also be present as shown for purposes of detecting and providing a voltage feedback from the secondary side circuitry 377 to PWM IC 312. In one embodiment, power supply output voltage detected by optocoupler circuit 408 may be compared to MOSFET 421 duty cycle from SR IC 380 to detect problems with power output from power supply 201. In such an embodiment, a non-zero power supply output voltage should correlate with duty cycle of MOSFET 421. However, if the power supply output is shorted, no output voltage will be detected by optocoupler circuit 408 while the MOSFET duty cycle output of SR IC 380 will show some level of active duty cycle. In one embodiment, PWM IC 312 and/or MCU digital core 407 may be configured to take a power supply shutdown action in the latter case (i.e., in the case where the combination of real time output voltage and MOSFET 421 duty cycle indicate that power supply output is shorted).

Still referring to FIG. 3A, during normal power supply operation, a sense resistor Rsense 403 is placed in series in the ground return path from system load 410 to secondary coil 314. An Op-Amp 406 may be provided as shown within MCU 390 to detect the voltage drop Vsense across Rsense 403 while current is supplied to system load 410 through "ON" output protection switch 400, and to provide this voltage drop as voltage 413 to MCU digital core 407 through analog-to-digital (ADC) converter 411. Digital core 407 compares this voltage drop to a voltage threshold Vth (e.g., stored in coupled non-volatile memory 399 shown in FIG. 4A) that corresponds to the OCP point, e.g., such as 100 VA limit. If voltage drop across Rsense exceeds the Vth, then digital core 407 shuts down the power supply 201 using DC output current by shutting down (or turning "OFF") output protection switch 400. Op-Amp 406 may be optionally present, for example, to allow a relatively small resistance (e.g., Rsense=on the order of a few milliohm) to be employed to conserve power consumption. In such a case, voltage drop across Rsense may be relatively small, and thus current sense op-amp comparator may be employed to amplify the resulting voltage drop comparison value that is provided to ADC 411.

Still referring to FIG. 3A, each of multiple known test resistance loads 404 and 405 and respective test switches 450 and 451 are placed in series in a respective current shunt path between Vbus out and ground return path 365 to secondary coil 314, and MCU digital core 407 is coupled to control test switches 450 and 451 as shown. Although two known test resistance loads 404 and 405 are illustrated in the embodiment of FIG. 3A, it will be understood that in another embodiment a single known test resistance load may be similarly placed in series with a single series test switch between Vbus out and ground return path 365 to secondary coil 314. Similarly, in another embodiment more than two test resistance loads may be placed in series with respective series test switches between Vbus out and ground return path 365 to secondary coil 314. In one embodiment, resistance value of test resistance loads 404 and 405 may be selected to fit the current and/or voltage range of a given output power supply application. In a further embodiment, Rsense 403 and/or test resistance loads such as 404 and 405 may be precision or "tight tolerance" resistors, e.g., less than 1% tolerance resistors.

As described below, a test current through the shunt path may be used during power supply startup and prior to enabling power output to system load 410 to verify the health of the sense resistor Rsense 403, and if resistance value of Rsense 403 is found out of range or otherwise defective, the power supply 201 may be automatically shut down. For example, when the sense resistor Rsense 403 is shorted the OCP circuit will malfunction and lose its OCP function to protect the system from high current damage. This may translate into quality and reliability concerns. Thus, using the embodiment of FIG. 3A to detect the fault in Rsense 403 and proactively shut down the PSU as described further below can prevent potential system damages and service calls.

In one exemplary embodiment, MCU digital core 407 may run a self-test at the beginning of each power up cycle of power supply 301. During the self-test, a test current 401 and/or 402 is passed through respective internal current shunt test resistors 404 and/or 405 via Rsense 403. During this time, MCU digital core (or controller IC or other suitable programmable integrated circuit) 407 monitors the voltage drop across Rsense 403. If no voltage is detected across Rsense 403, it means Rsense 403 is shorted and the MCU digital core 407 or controller IC is programmed to respond by turning "OFF" the output protection switch SW1 400, thus cutting off output power to Vbus port and system load 410. Likewise, if the wrong voltage is detected across Rsense 403, it is an indication that Rsense 403 is missing, open, or has the wrong resistance value. Under such condition MCU digital core 407 is also programmed to disable output power to system load 410.

Figure 3B:
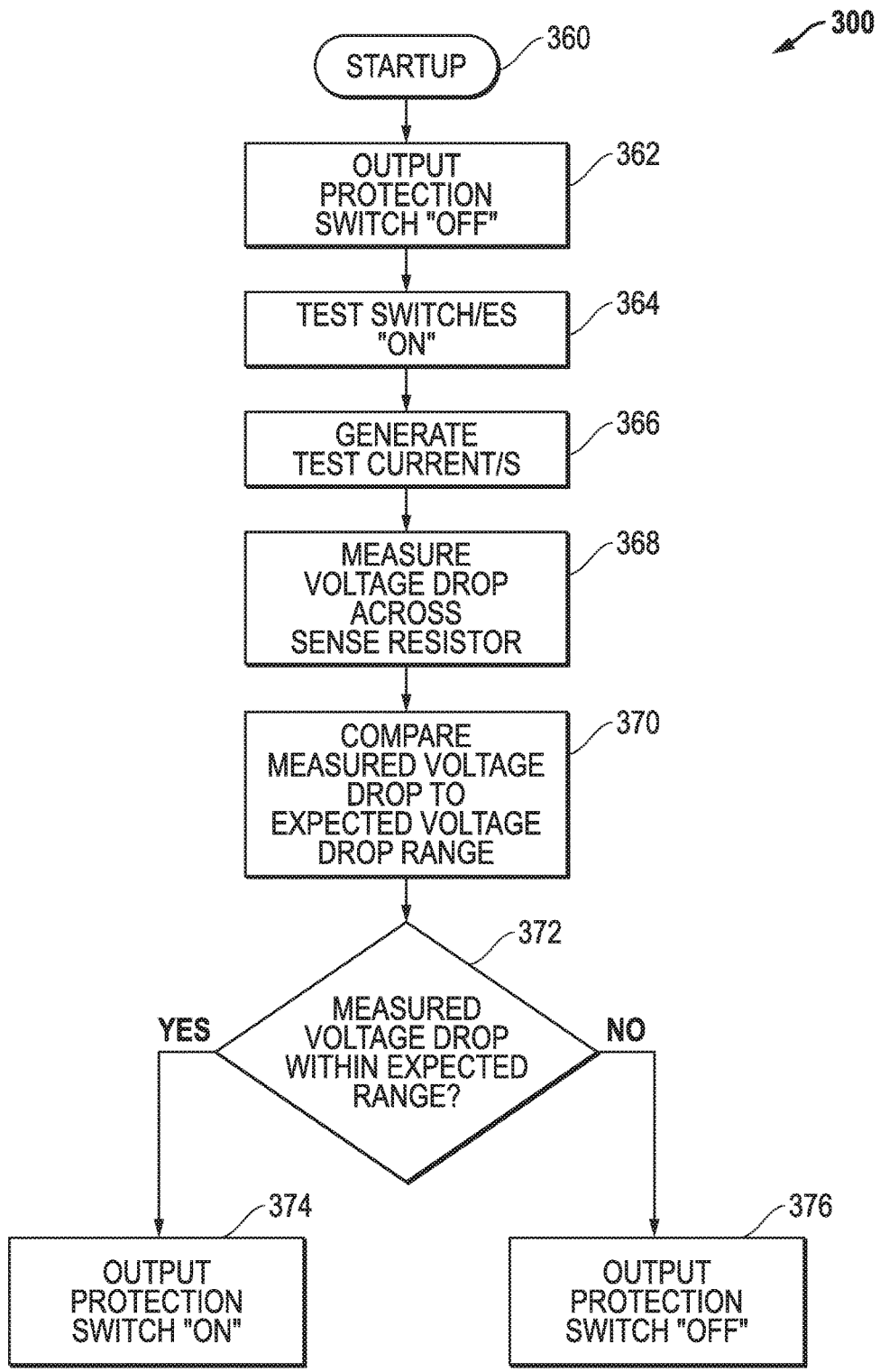
FIG. 3B illustrates sense resistor verification methodology according to one exemplary embodiment of the disclosed systems and methods.

Referring now to methodology 300 of FIG. 3B, output protection switch (SW1) 400 may in one embodiment be controlled by MCU digital core 407 to be "OFF" during step 362 of startup or power-on operation 360 of power supply 201. With output protection switch 400 "OFF", test switches 450 and 451 may be first turned "ON" by MCU digital core 407 in step 364 prior to enabling or turning "ON" the output protection switch (SW1) 400 to allow power output to load 410. With test switches 450 and 451 "ON" and with output protection switch 400 "OFF", MCU digital core 407 uses optocoupler 408 feedback to control PWM IC 312 (e.g., brighter LED light level may correlate to higher voltage) to cause sequential or simultaneous generation of two test currents I1 (401) and I2 (402) in step 366 of known value that are passed through test resistance loads 404 and 405 of the current shunt path as shown in FIG. 3A, with sense resistor 403 coupled in series with the test loads 404 and 405. Op-Amp 406 detects the actual voltage drop Sense across Rsense 403 in step 368 while test currents I1 and I2 are passed through Rsense 403, and provides this voltage drop to MCU digital core 407 through ADC 411. Given that test current is a function of I=V/R, the test current may be calculated given the known voltage and the resistance. Since the values of the test load resistors 404 and 405 are each known, the expected currents I1 and I2 through them and the resulting expected voltage drop (Vsense) across expected known resistance Rsense can be calculated during flow of the known test currents I1 and I2 through Rsense. The actual measured Vsense may then be compared to the expected Vsense in step 370 to verify if Rsense has a valid resistance value.

Assuming that the measured Vsense value 409 from Op-Amp 406 is found to match the expected calculated voltage drop Vsense value in step 372, then digital core 407 may enable power supply 201 to supply output power to system load 410 by turning "ON" output protection switch 400 in step 374. However, in the case that the measured Vsense value 409 from Op-Amp 406 does not match the expected calculated voltage drop value (e.g., no voltage drop detected, open circuit detected, wrong voltage drop that is out of expected range is detected) in step 372, digital core 407 may place power supply 201 into protection mode and disable its output power by maintaining output protection switch 400 in the "OFF" condition in step 376. It will be understood that a similar methodology may be applied by only turning on one of test switches 450 and 451 with output protection switch (SW1) 400 "OFF" to generate a single test current I1 (401) or I2 (402) of known value that is passed through one of test resistance loads 404 or 405, and Vsense 409 across Rsense 403 measured and compared to a calculated expected Vsense value for the single test current I1 or I2 to determine if Rsense 403 is incorrectly-sized or defective.

As an example of normal startup operating condition for power supply 201, assume a test current of 1 ampere, that Rsense=5 milliohm, and op-amp 406 has a gain of 60. Under these conditions, Vsense 409 will be 5 millivolts, and VA 413 will be 60*5 millivolts=0.3 Volts. MCU digital core 407 checks VA voltage level via ADC 409 to confirm it is within a defined VA operating voltage range (e.g., such as 0.3V+/−x %) for the normal operating condition of VA=0.3 Volts. Assuming so, then MCU digital core 407 places output protection switch SW1 400 in "ON" condition such that DC output current is supplied through output protection switch 400 to Vbus of information handling system 202. However, if VA 413 voltage level is outside the defined voltage range, then MCU digital core 407 will shut down output protection switch SW1 400 in the "OFF" condition such that no DC output current is supplied through output protection switch 400 to Vbus of information handling system 202. In one embodiment, MCU digital core 407 control may be used to detect the health of Rsense 403 when doing safety single fault (open/short) or other faults with Rsense 403.

As a first example of abnormal startup operation of power supply 201 in which Rsense 403 is shorted, assume that Vsense=0 millivolts, gain of op-amp 406 is 60, and VA 413 is therefore 60*0 mV=0 volts. MCU digital core 407 detects VA 413=0 volts as a fault condition, and turns "OFF" output protection switch 400, cutting power to system load 410. As a second example of abnormal startup operation of power supply 201 in which Rsense 403 is open (no electrical conduction), then VA 413 will be outside the defined correct VA operating voltage range (e.g., VA=Vbus equivalent). MCU digital core 407 detects this incorrect VA 413 value as a fault condition, and turns "OFF" output protection switch 400, cutting power to system load 410.

In another exemplary embodiment, after successful startup of the power supply 201 and with power output to system load 410 enabled (i.e., with output switch 400 "ON" and test switches 450 and 451 "OFF"), the power supply configuration embodiment of FIG. 3A may also be employed for real time monitoring of Rsense 403. In this regard, real time protection of the system from over current damage may be provided in the event Rsense is shorted during normal operation. Referring now to exemplary methodology 310 of FIG. 3C, while Vbus power is supplied to system load 410 in step 378, the MCU digital core may monitor the output power rate information provided from primary side PWM IC 312 via optical coupler 408a/408b in step 379. The digital core 407 may use this monitored power rate information of step 379 to calculate real time output power rate and compare that in step 383 to the measured Vsense voltage 409 from Rsense 403 of step 381 to determine if measured Vsense matches the present operating conditions. For example, abnormal Rsense condition is indicated if no Vsense voltage 409 is sensed from Rsense 403 in step 381 but the power rate information from primary side PWM IC 312 in step 379 shows there is actually power consumption, it indicates that Rsense 403 is shorted and the MCU digital core 407 will turn "OFF" the output protection switch 400 in step 389, thus cutting output power to Vbus port and system load 410. However, if expected Vsense voltage 409 is sensed from Rsense 403 in step 381 that matches the power rate information from primary side PWM IC 312 in step 379, then will MCU digital core 407 will maintain "the output protection switch 400 "ON" in step 389, thus continuing to supply output power to Vbus port and system load 410

Figure 3C:
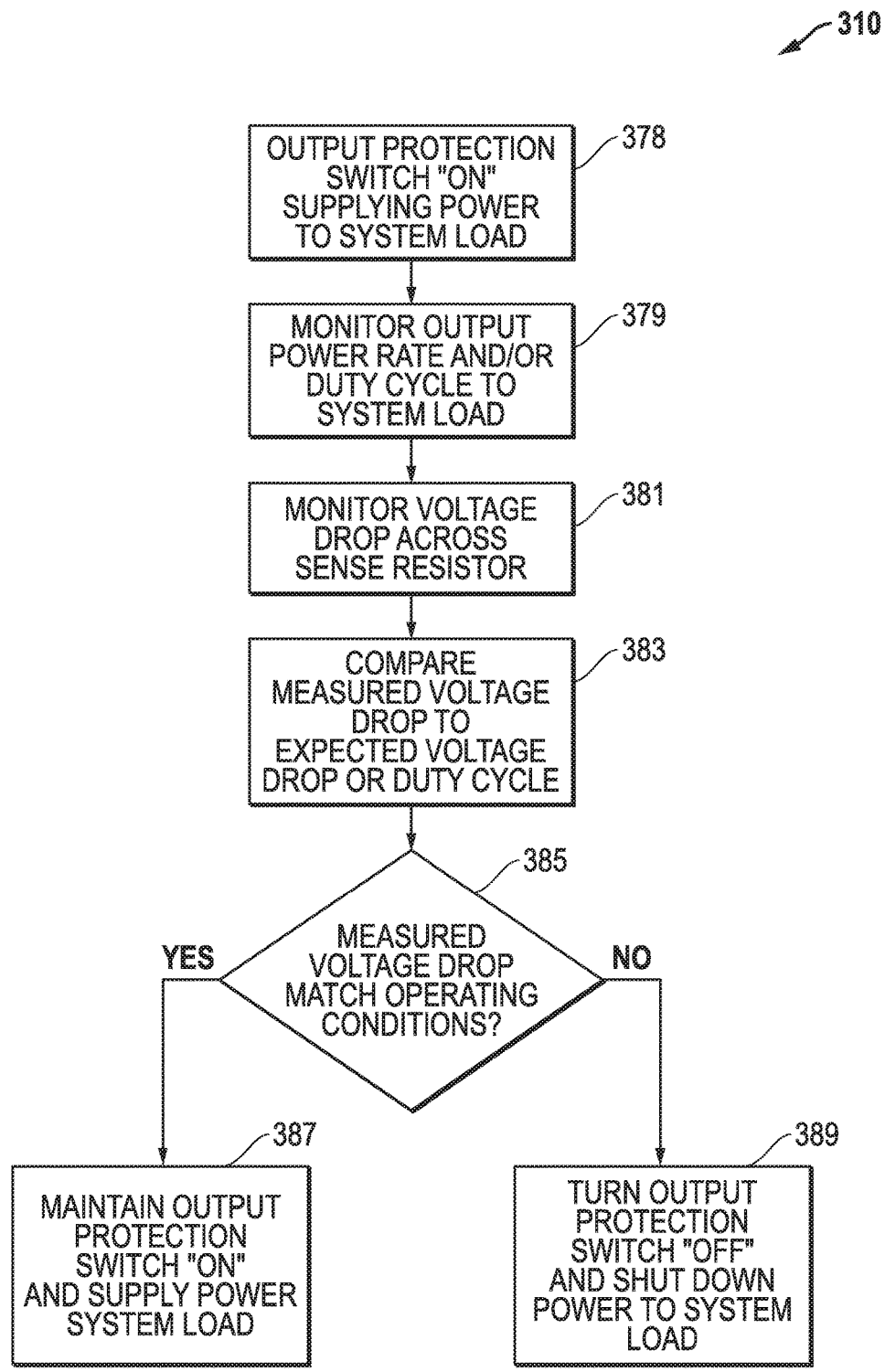
FIG. 3C illustrates sense resistor verification methodology according to one exemplary embodiment of the disclosed systems and methods.

In a further embodiment related to FIG. 3C, MCU digital core 407 may capture the real time duty cycle of the synchronized rectifier circuit 380 via a general purpose IO (GPIO) in step 379. This captured real time duty cycle for power supply 201 is proportional to the power supply output power, and may be used by MCU digital core 207 in combination with the monitored VA 413 voltage level of steep 381 to identify if the Rsense 403 is shorted. For example, if Rsense 403 is shorted while duty cycle (and therefore output power) of power supply 201 is increasing, monitored VA 413 will not increase with the duty cycle. MCU digital core 407 may be employed to use this combination of increasing power supply duty cycle with non-increasing voltage of VA 413 to identify a shorted Rsense fault in step 385 since it does not make sense for duty cycle to increase without VA 413 voltage level also increasing. In the case of indicated shorted Rsense 403, then methodology 310 proceeds to step 389 with shutdown of output power and power supply 201. If no shorted Rsense is indicated, then methodology 310 proceeds to step 387 and continues supplying power to system load 210.

Figure 4A:
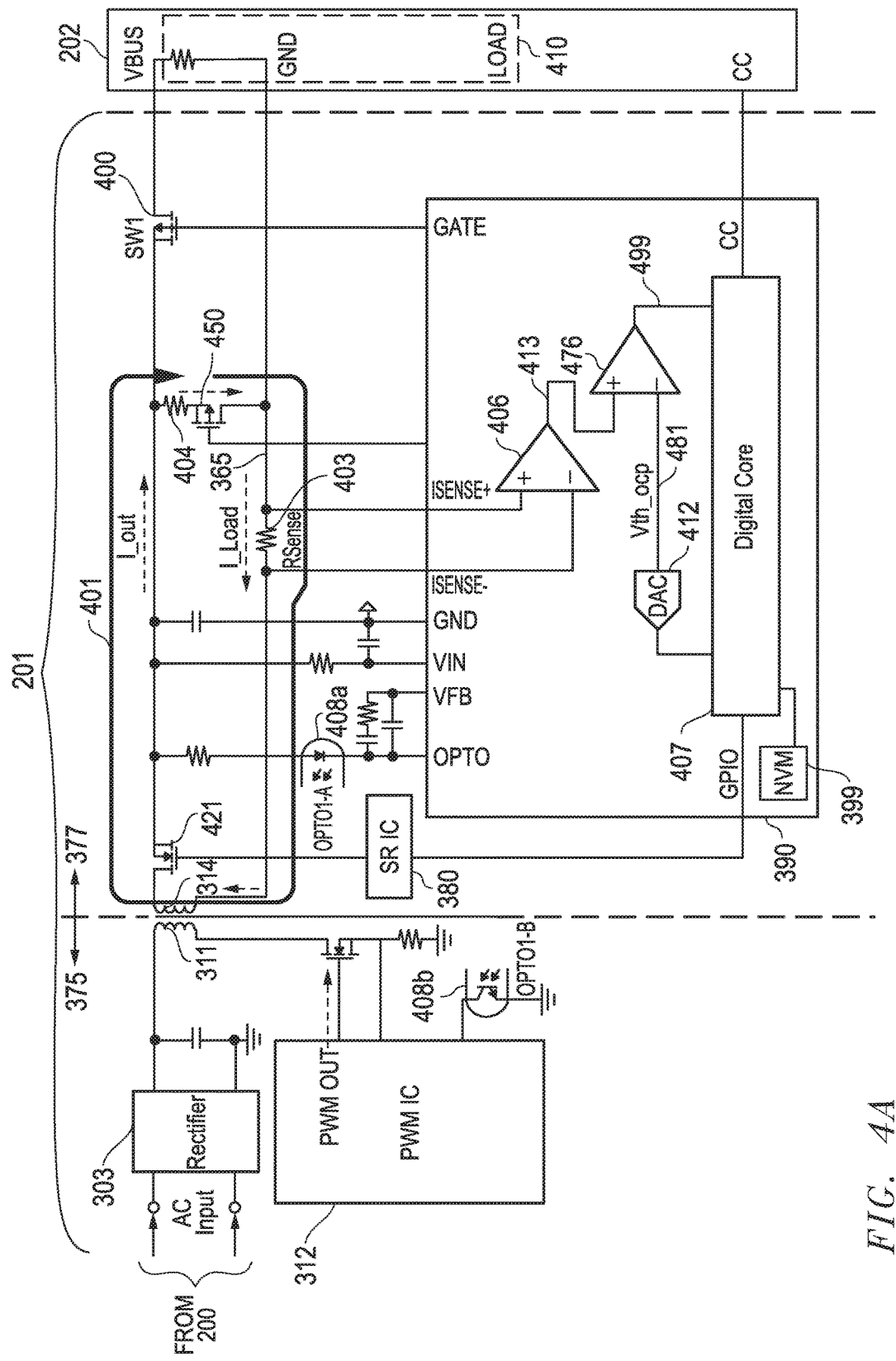
FIG. 4A illustrates a simplified circuit diagram of a power supply according to one exemplary embodiment of the disclosed systems and methods.

In another embodiment of the disclosed systems and methods, a current shunt may be employed to perform automatic trimming (auto trimming) of a changeable OCP trigger point (Vth_OCP) in a manner that overcomes the controller IC device-to-device variation and/or Rsense 403 tolerance range variation during mass production of power supply units 201 to achieve OCP protection with high precision by auto trimming the OCP by adjusting Vth_OCP to account for tolerance of the particular electric components of each different hardware power supply device 201. In this regard, FIG. 4A illustrates a circuit diagram of power supply 201 that includes similar circuitry as power supply 201 of the embodiment of FIG. 3A including Op-Amp 406 that detects the actual voltage drop Vsense across Rsense 403 and provides this voltage drop as voltage 413 to current error op-amp comparator 476 for comparison to pre-set Vth value provided from output of digital-to-analog converter 415 as described further herein. Also, in the embodiment of FIG. 4A, a single internal current shunt test resistor 404 is provided to allow a test current 401 to be selectably passed through an internal current shunt test resistor 404 via Rsense 403 under the control of test switch 450 that itself may be controlled to be either "ON" or "OFF" by MCU digital core 407. Thus, the embodiment of FIG. 4A may also be optionally also employed to verify that the resistance value of the current sense resistor 403 is correct for single fault condition in a manner as described elsewhere herein.

In the auto trimming embodiment of FIG. 4A, MCU digital core 407 may control power supply 201 to turn on its output power with a suitable voltage to generate a predefined value of auto trimming test current flow 401. Such an auto trimming test current flow value may be pre-defined, for example, at the power supply circuit design stage and may be stored in advance in the firmware/memory 399 of MCU digital core 407. In one exemplary embodiment, an auto trimming test current value may be programmable by firmware coding changes. For a specific current flow through Rsense 403 during normal power supply operation, MCU 390 may obtain the current information voltage drop across Rsense 403 in manner similar to the embodiment of FIG. 3A using op-amp 406 which amplifies and provides the measured voltage drop across Rsense 403 to op-amp comparator 476 where it is compared to a preset value 481 of Vth_OCP that is provided to current error op-amp comparator 476 via DAC 412, and output to MCU digital core 207 as a voltage 499 representative of the results of this comparison. If the amplified voltage 413 (which is a representation of Rsense current) exceeds the preset Vth_OCP trip point limit 481, an OCP condition is indicated by current error op-amp comparator 476 to MCU digital core 207 by voltage 499, and MCU digital core 207 will respond by disabling or turning "OFF" the output power switch SW1 400. In the illustrated embodiment, MCU digital core 207 may programmatically set value of preset Vth_OCP 481 to any appropriate or otherwise defined value (volts) to be used as reference for the current error op-amp comparator 476.

Figure 5:
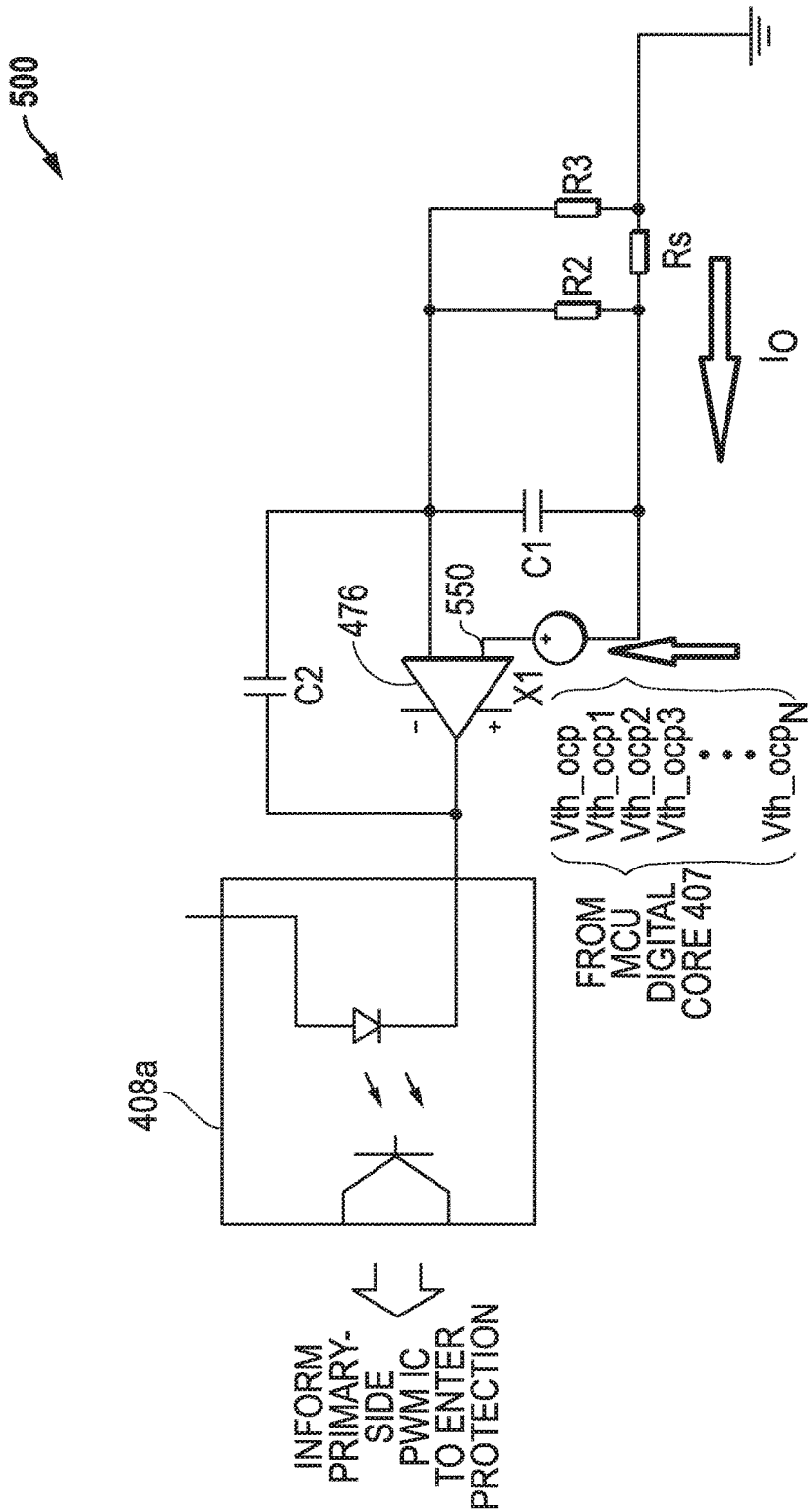
FIG. 5 illustrates a partial secondary-side circuit diagram for a power supply according to one exemplary embodiment of the disclosed systems and methods.

In one exemplary embodiment illustrated in FIG. 5, OCP trip point may be trimmed during factory calibration or using an auto calibration routine in the field. In such an embodiment, prior to turning "ON" the blocking MOSFET output protection switch 400, a target value of OCP test current 401 may be passed through the test load resistance 401 via the Rsense 403 to generate an OCP voltage drop Vsense that may be compared with pre-defined data, e.g., stored external to power supply circuitry or that may be stored in memory 399 coupled to and/or internal to, the MCU digital core 407. The MCU digital core 407 may then select a single correct Vth_OCP value 481 from the multiple pre-defined values $Vth\_OCP_1$ to $Vth\_OCP_N$ as the reference input for current error op-amp 476 as shown in FIG. 5 that is a partial secondary-side circuit diagram 500 from power supply 201. In one exemplary embodiment, MCU digital core 407 may select one of multiple predefined Vth_OCP values $Vth\_OCP_1$ to $Vth\_OCP_N$ to be stored in memory 399 for use as Vth_OCP value 481 that is closest to the OCP voltage drop Vsense measured while target value of OCP test current 401 is passed through the test load resistance 401 via the Rsense 403. In this way, an outside test current 401 may be used to set the correct or optimized OCP voltage threshold value (Vth_OCP) from multiple different Vth_OCP values that corresponds to the actual Rsense and/or programmable integrated circuit or power supply circuitry conditions. Alternatively, the actual voltage drop Vsense value measured while target value of OCP test current 401 is passed through the test load resistance 401 may be stored in memory 399 as Vth_OCP value 481. In either case, such an optimized Vth_OCP value may be so selected to obtain an OCP point that more precisely meets LPS requirements than is possible with conventional circuit configurations, e.g., to provide power supply 201 as a 90 Watt AC adapter having tolerance less than 10 Watts to meet the LPS safety limit of ≤100 VA.

Figure 4B:
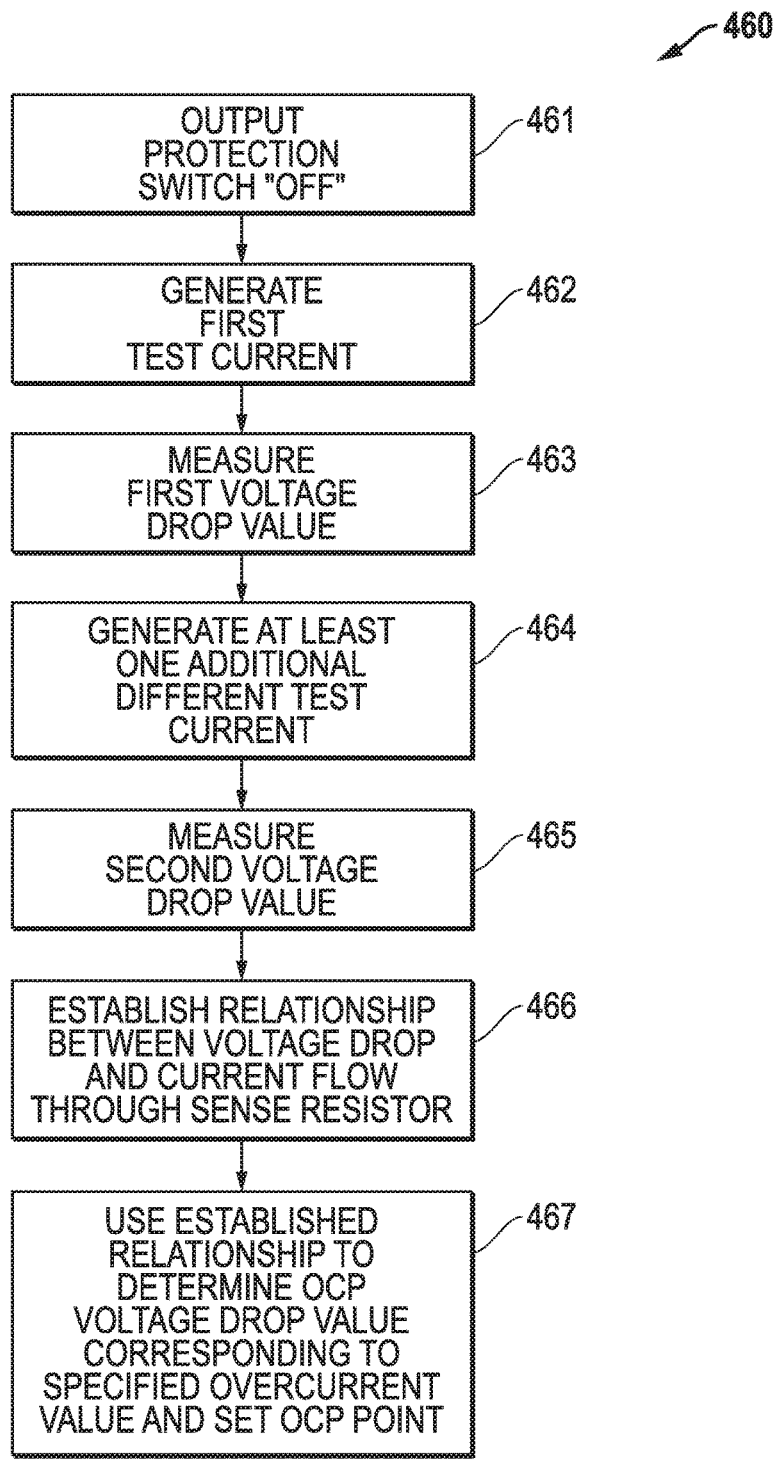
FIG. 4B illustrates OCP voltage drop trimming methodology according to one exemplary embodiment of the disclosed systems and methods.
Figure 6:
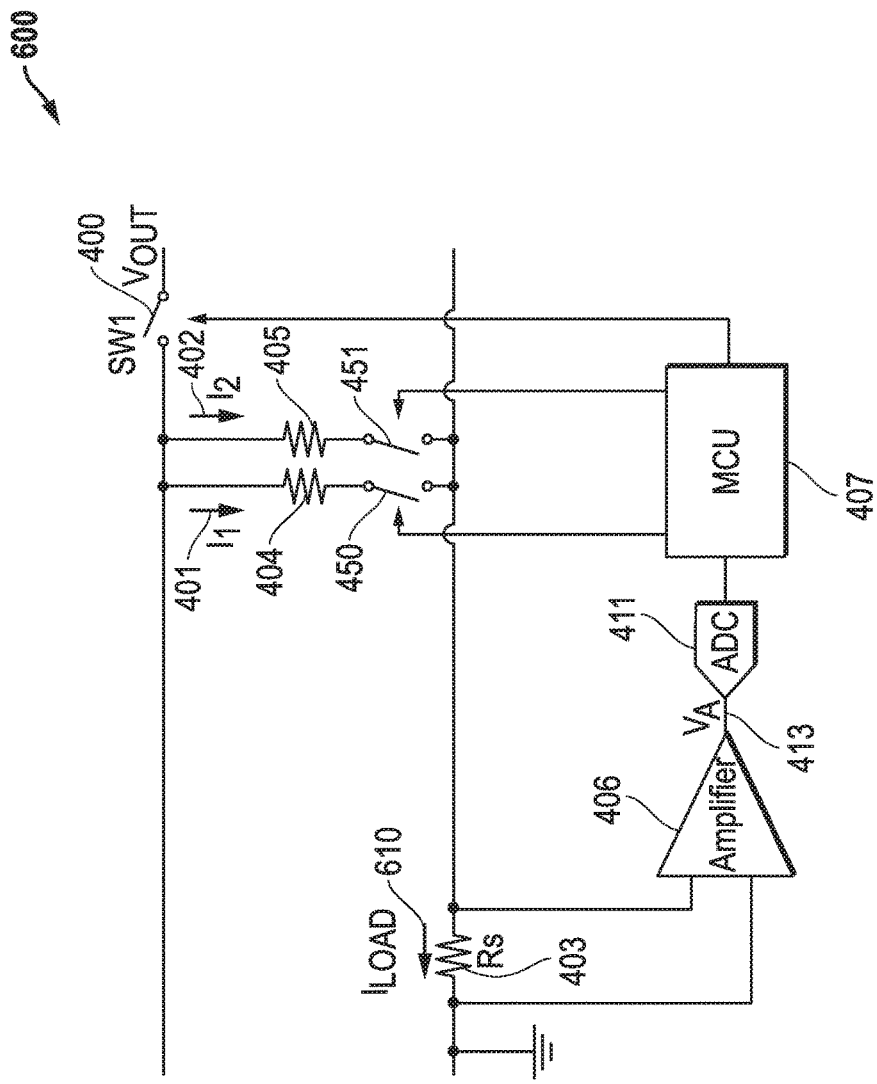
FIG. 6 illustrates a partial secondary-side circuit diagram for a power supply according to one exemplary embodiment of the disclosed systems and methods.

Referring now to FIG. 6 that is a partial secondary-side circuit diagram 600 from power supply 201, an extrapolation methodology 460 of FIG. 4B may be employed to measure voltage drop (Vsense)-based values across Rsense 403 for at least two different $I_{LOAD}$ values to obtain a more precise Vth_OCP value that corresponds to the desired or otherwise specified OCP point, e.g., for use during normal operation of the embodiments of FIG. 3A or 4A. For example, referring to partial circuit diagram of FIG. 6, with output protection switch SW1 400 turned "OFF" in step 461, only test switch 450 may be turned "ON" to obtain first test current I1 401 as $I_{LOAD}$ 610 through Rsense 403 in step 462 while Vsense is measured across Rsense 430 in step 463, and a corresponding ADC reading $N_1$ is generated from ADC 411 to MCU digital core 407. Separately (before or after obtaining ADC reading $N_1$), both test switches 450 and 451 may be simultaneously turned "ON" to obtain second and different test current I1+I2 as $I_{LOAD}$ 610 through Rsense 403 in step 464 while voltage drop (Vsense) is measured across Rsense 430 in step 465, and a corresponding ADC reading $N_2$ is generated from ADC 411 to MCU digital core 407.

Figure 7:
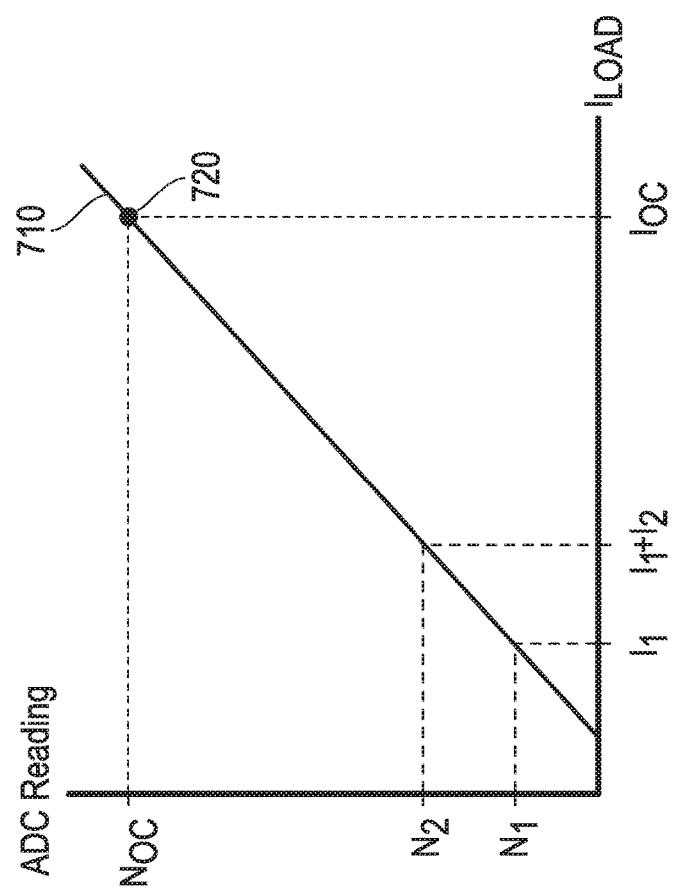
FIG. 7 illustrates an established relationship of measured voltage drop across a sense resistor as a function of current flow through the sense resistor according to one exemplary embodiment of the disclosed systems and methods.

A relationship between $I_{LOAD}$ 610 value across Rsense 403 and voltage drop (Vsense)-based ADC reading N may be established in step 466 using the measured ADC readings $N_1$ and $N_2$ at the respective different values of $I_{LOAD}$, e.g., as illustrated by the plotted sloped line 710 of ADC reading N versus $I_{LOAD}$ in FIG. 7. It will be understood that in such a relationship, actual ADC values N will be dependent on the resolution of the ADC used. Once a slope of relationship 710 has been established in step 466, then in step 467 a Vth_OCP value of overcurrent ADC reading ($N_{OC}$) may be determined at intersection 720 for the known overcurrent value $I_{OC}$ that corresponds to the specified OCP point, e.g., OCP point=apparent power of 100 VA or other specified OCP point value. It will be understood that ADC reading (N) is only one example of suitable type of voltage drop (Vsense)-based value that may be used to establish a relationship with current flow ($I_{LOAD}$) through a sense resistor Rsense. Any other suitable voltage drop (Vsense)-based value may be similarly employed, e.g., such as measured voltage value itself, etc.

Following is an exemplary embodiment and example of extrapolation methodology to obtain a more precise Vth_OCP value that corresponds to the desired or otherwise specified OCP point. Assume that specified overcurrent value $I_{OC}$=4.75 amperes (e.g., such as may correspond to an apparent power OCP point of 100 VA for a power supply 201 having an output voltage of 20 volts). At or immediately after power on of power supply 201, output protection switch SW1 400 is turned "OFF". Then only test switch 450 is turned "ON" to obtain $I_{LOAD}$ 610=test current I1=0.5 amperes with measured ADC reading $N_1$. Next, both test switches 450 and 451 are simultaneously turned "ON" to obtain $I_{LOAD}$ 610=test current I1+I2=0.5+0.5 amperes with measured ADC reading $N_2$. For the relationship of FIG. 7, the following calculations may be performed (e.g., automatically by programmed MCU digital core 407) to calculate OCP trip point $N_{OC}$ corresponding to Vth_OCP:

$$(N_2-N_1)/(I_1+I_2-I_1)=(N_{OC}-N_2)/(I_{OC}-I_2); \text{ or}$$

for the above-given values of $I_1$, $I_2$ and $I_{OC}$ values of the present example:

$$N_{OC}=\{[(N_2-N_1)/0.5]\times(4.75-0.5)\}+N_2=9.5N_2-8.5N_1.$$

After the correct $N_{OC}$ value corresponding to the specified Vth_OCP value is calculated as per above, MCU digital core 207 may use this calculated $N_{OC}$ value to set up this Vth_OCP value on inverting pin 550 of op-amp comparator 476. In such an embodiment, for example, an untrimmed original OCP point of a 20 volt power supply 201 that exceeds the 100 VA LPS specification may be replaced with an auto trimmed OCP point that is less than 100 VA.

It will be understood that the particular circuit configurations illustrated in the Figures herein are exemplary only (including the exemplary number and type of circuit components, as well as interconnection topology of such components). Also only exemplary are the particular example voltage values and the particular example current values described herein. In this regard, it will be understood that any alternate configuration of circuit components may employed that is suitable for implementing automatic overcurrent protection (OCP) point calibration and/or current sense resistor (Rsense) verification. It will also be understood that one or more of the tasks, functions, or methodologies described herein (e.g., for secondary side microcontroller 390, MCU digital core 407, PWM IC 312, SR IC 380, etc.) may be implemented using one or more programmable integrated circuits (e.g., central processing units (CPUs), processors, controllers, microcontrollers, microprocessors, hardware accelerators, FPGAs (field programmable gate arrays), ASICs (application specific integrated circuits), and/or other programmable integrated circuits) that are programmed to perform the operations, tasks, functions, or actions described herein for the disclosed embodiments. For example, the one or more programmable integrated circuits can be configured to execute or otherwise be programmed with software, firmware, logic, and/or other program instructions stored in one or more non-transitory tangible computer-readable mediums (e.g., example, data storage devices, flash memories, random access memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For example, one or more of the tasks, functions, or methodologies described herein may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a programmable integrated circuit such as CPU, controller, microcontroller, microprocessor, ASIC, etc. or executed on a programmable logic device "PLD" such as FPGA, complex programmable logic device "CPLD", etc.) to perform one or more steps of the methodologies disclosed herein. In one embodiment, a group of such processors and PLDs may be programmable integrated circuits selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodology disclosed herein. It will also be understood that one or more steps of the present methodologies may be employed in one or more code segments of the computer program. For example, a code segment executed by the information handling system may include one or more steps of the disclosed methodologies.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A power supply unit (PSU) including a primary side and a secondary side that are separated by a transformer, comprising:
    transformer circuitry having a primary side winding and a secondary side winding;
    primary side circuitry including the primary side winding of the transformer and configured to receive input power at a PSU power input;
    secondary side circuitry including the secondary side winding of the transformer coupled to a DC output current loop that includes first and second DC current loop paths, the secondary side circuitry configured to receive power from the primary side circuitry through the transformer and to supply direct current (DC) power to a PSU power output through the DC current loop paths of the DC output current loop;
    an output power switch coupled within the DC output current loop between the transformer and the PSU power output, the output power switch being coupled to selectively connect and disconnect the PSU power output from the transformer;
    a sense resistor coupled within one of the first or second DC current loop paths between the transformer and the output power switch;
    at least one current shunt coupled between the first and second DC current loop paths at a node located between the sense resistor and the output power switch to provide a test current path through the current shunt and the DC current loop with the PSU power output disconnected from the transformer by the output power switch, the current shunt having a resistance value selected to yield an expected test current value through the current shunt and the DC current loop at a given output voltage from the transformer; and
    at least one programmable integrated circuit coupled to control the output power switch and programmed to selectively disconnect the PSU power output from the transformer while the secondary side of the transformer is supply DC power to produce a test current through the test current path and to monitor a voltage drop across the sense resistor while the test current is flowing across the sense resistor with the PSU power output being disconnected from the transformer by the output power switch, the programmable integrated circuit being further programmed to:
        compare the expected voltage drop to the monitored voltage drop across the sense resistor while the test current is flowing across the sense resistor, and
        determine whether or not to control the output power switch to connect the PSU power output to the transformer based on the comparison of the monitored voltage drop across the sense resistor to the expected voltage drop across the sense resistor.

2. The PSU of claim 1, where the at least one current shunt comprises a test switch coupled between the first and second DC current loop paths to selectively connect and disconnect the test current path through the current shunt and the DC current loop, the at least one programmable integrated circuit coupled to control the test switch to selectively connect and disconnect the test current path through the current shunt and the DC current loop.

3. The PSU of claim 1, where the expected voltage drop is a voltage value or a range of voltage values; and where the programmable integrated circuit is programmed to:
    not connect the PSU power output to the transformer with the output power switch if the monitored voltage drop across the sense resistor is greater or lesser than the expected voltage drop; and
    connect the PSU power output to the transformer with the output power switch if the monitored voltage drop across the sense resistor is equal to the expected voltage drop.

4. The PSU of claim 1, where the expected voltage drop is a voltage value or a range of voltage values; and where the programmable integrated circuit is programmed to not connect the PSU power output to the transformer with the output power switch if the monitored voltage drop across the sense resistor is greater or lesser than the expected voltage drop.

5. The PSU of claim 1, where the expected voltage drop is a voltage value or a range of voltage values; and where the programmable integrated circuit is programmed to connect the PSU power output to the transformer with the output power switch if the monitored voltage drop across the sense resistor is equal to the expected voltage drop.

6. The PSU of claim 1, comprising at least two different current shunts coupled in parallel between the first and second DC current loop paths at respective nodes located between the sense resistor and the output power switch, each given one of the current shunts having a resistance value selected to yield an expected test current value through the given current shunt at a given output voltage from the transformer; where each given one of the current shunts comprises a test switch coupled between the first and second DC current loop paths to selectively connect and disconnect a test current path through the given current shunt and the DC current loop, the at least one programmable integrated circuit coupled to control each of the test switches to selectively connect and disconnect the test current path through each given current shunt.

7. The PSU of claim 6, where the at least one programmable integrated circuit is programmed to monitor a first voltage drop across the sense resistor while DC output power is flowing from the transformer through the DC current loop to the PSU power output the across the sense resistor with the PSU power output being connected to the transformer by the output power switch, the programmable integrated circuit being further programmed to compare the monitored first voltage drop to a voltage threshold (Vth) value that corresponds to an overcurrent protection (OCP) apparent power limit, and to selectively disconnect the PSU power output from the transformer when a monitored value of the first voltage drop exceeds the Vth; and where the programmable integrated circuit is further programmed to perform the following steps while the with the PSU power output disconnected from the transformer by the output power switch:

first control the test switches to selectively cause a first current value to flow through at least one of the current shunts and the DC current loop, and measure a first voltage drop value across the sense resistor while the first current value is flowing through the DC current loop;

then control the test switches to selectively cause a second and different current value to flow through at least one of the current shunts and the DC current loop, and measure a second and different voltage drop value across the sense resistor while the second current value is flowing through the DC current loop; and then select the Vth value based on a relationship between the first and second voltage drop values and the values of the first and second test currents.

8. The PSU of claim 1, where upon each power up cycle of the PSU the at least one programmable integrated circuit is programmed to perform the following steps:

first control the output power switch to disconnect the PSU power output from the transformer before supplying any direct current (DC) power to the PSU power output through the DC current loop paths of the DC output current loop;

then control the PSU to supply DC power from the secondary side of the transformer to produce a test current through the test current path;

monitor a voltage drop across the sense resistor while the test current is flowing across the sense resistor with the PSU power output being disconnected from the transformer by the output power switch;

compare the expected voltage drop to the monitored voltage drop across the sense resistor while the test current is flowing across the sense resistor, and control the output power switch to connect the PSU power output to the transformer while the secondary side of the transformer is supplying power to the DC output current loop only if the monitored voltage drop across the sense resistor is equal to the expected voltage drop.

9. A power supply unit (PSU) including a primary side and a secondary side that are separated by a transformer, comprising:

transformer circuitry having a primary side winding and a secondary side winding;

primary side circuitry including the primary side winding of the transformer and configured to receive input power at a PSU power input;

secondary side circuitry including the secondary side winding of the transformer coupled to a DC output current loop that includes first and second DC current loop paths, the secondary side circuitry configured to receive power from the primary side circuitry through the transformer and to supply direct current (DC) power to a PSU power output and a power-consuming load through the DC current loop paths of the DC output current loop;

an output power switch coupled within the DC output current loop between the transformer and the PSU power output, the output power switch being coupled to selectively connect and disconnect the PSU power output from the transformer;

a sense resistor coupled within one of the first or second DC current loop paths between the transformer and the output power switch; and at least one programmable integrated circuit programmed to:

control the PSU to supply DC output power through the DC current loop to the PSU power output with the PSU power output being connected to the transformer by the output power switch, monitor the DC output power supplied through the DC current loop to the PSU power output and determine an expected voltage drop across the sense resistor that corresponds to a value of the monitored DC output power, monitor a voltage drop across the sense resistor while the monitored DC output power is supplied through the DC current loop to the PSU power output, compare the expected voltage drop to the monitored voltage drop across the sense resistor while the monitored DC output power is supplied through the DC current loop to the PSU power output, control the output power switch to disconnect the PSU power output to the transformer if the monitored voltage drop does not equal the expected voltage drop, and control the output power switch to maintain the PSU power output connected to the transformer if the monitored voltage drop equals the expected voltage drop.

10. The PSU of claim 9, where primary side circuitry comprises a first programmable integrated circuit programmed to control the primary side circuitry to cause the transformer to supply the DC output power through the DC current loop to the PSU power output and to monitor the value of the DC output power supplied through the DC current loop to the PSU power output; where the secondary side circuitry comprises a second programmable integrated circuit programmed to monitor the voltage drop across the sense resistor and to control the output power switch to selectively connect and disconnect the PSU power output from the transformer; where the first programmable integrated circuit is communicatively coupled to the second programmable integrated circuit; and where the second programmable integrated circuit is programmed to:

receive from the first programmable integrated circuit a value of the monitored DC output power supplied through the DC current loop to the PSU power output;

determine the expected voltage drop across the sense resistor that corresponds to the value of the monitored DC output power;

monitor the voltage drop across the sense resistor while the monitored DC output power is supplied through the DC current loop to the PSU power output;

compare the expected voltage drop to the monitored voltage drop across the sense resistor while the monitored DC output power is supplied through the DC current loop to the PSU power output;

control the output power switch to disconnect the PSU power output from the transformer if the monitored voltage drop does not equal the expected voltage drop; and control the output power switch to maintain the PSU power output connected to the transformer if the monitored voltage drop equals the expected voltage drop.

11. A method of operating a power supply unit (PSU) system including primary side circuitry and secondary side circuitry that are separated by a transformer, the method comprising:

receiving a power input in the primary side circuitry of the PSU, the primary side circuitry of the PSU including a primary side winding of the transformer;

receiving power in the secondary side circuitry from the primary side circuitry, the secondary side circuitry including the secondary side winding of the transformer coupled to a DC output current loop that includes first and second DC current loop paths and an output power switch coupled within the DC output current loop between the transformer and a PSU power output; and using at least one programmable integrated circuit to control the output power switch coupled within the DC output current loop between the transformer and the PSU power output to selectively connect and disconnect the PSU power output from the transformer;

using at least one programmable integrated circuit to monitor a voltage drop across a sense resistor coupled within one of the first or second DC current loop paths between the transformer and the output power switch while a test current is flowing across the sense resistor that is produced through a test current path that includes the DC current loop and at least one current shunt coupled between the first and second DC current loop paths at a node located between the sense resistor and the output power switch while the PSU power output is selectively disconnected from the transformer by the output power switch, the current shunt having a resistance value selected to yield an expected test current value through the current shunt and the DC current loop at a given output voltage from the transformer; and using the at least one programmed integrated circuit to
compare the expected voltage drop to the monitored voltage drop across the sense resistor while the test current is flowing across the sense resistor, and
determine whether or not to control the output power switch to connect the PSU power output to the transformer based on the comparison of the monitored voltage drop across the sense resistor to the expected voltage drop across the sense resistor.

12. The method of claim 11, where the at least one current shunt comprises a test switch coupled between the first and second DC current loop paths; and where the method further comprising using the at least one programmable integrated circuit to control the test switch to selectively connect and disconnect the test current path through the current shunt and the DC current loop.

13. The method of claim 11, where the expected voltage drop is a voltage value or a range of voltage values; and where the method further comprises using the programmable integrated circuit to:

not connect the PSU power output to the transformer with the output power switch if the monitored voltage drop across the sense resistor is greater or lesser than the expected voltage drop; and connect the PSU power output to the transformer with the output power switch if the monitored voltage drop across the sense resistor is equal to the expected voltage drop.

14. The method of claim 11, where the expected voltage drop is a voltage value or a range of voltage values; and where the method further comprises using the programmable integrated circuit to not connect the PSU power output to the transformer with the output power switch if the monitored voltage drop across the sense resistor is greater or lesser than the expected voltage drop.

15. The method of claim 11, where the expected voltage drop is a voltage value or a range of voltage values; and where the method further comprises using the programmable integrated circuit to connect the PSU power output to the transformer with the output power switch if the monitored voltage drop across the sense resistor is equal to the expected voltage drop.

16. The method of claim 11, further comprising using the at least one programmable integrated circuit to control at least two different test switches of the secondary side circuitry to selectively connect and disconnect a test current path through each of at least two respective different current shunts and the DC current loop, the at least two different current shunts being coupled in parallel between the first and second DC current loop paths at respective nodes located between the sense resistor and the output power switch; where each given one of the current shunts has a resistance value selected to yield an expected test current value through the given current shunt at a given output voltage from the transformer.

17. The method of claim 16, further comprising using the at least one programmable integrated circuit to:

monitor a first voltage drop across the sense resistor while DC output power is flowing from the transformer through the DC current loop to the PSU power output the across the sense resistor with the PSU power output being connected to the transformer by the output power switch;

compare the monitored first voltage drop to a voltage threshold (Vth) value that corresponds to an overcurrent protection (OCP) apparent power limit, and to selectively disconnect the PSU power output from the transformer when a monitored value of the first voltage drop exceeds the Vth;

perform the following steps while the PSU power output is disconnected from the transformer by the output power switch:

first control the test switches to selectively cause a first current value to flow through at least one of the current shunts and the DC current loop, and measure a first voltage drop value across the sense resistor while the first current value is flowing through the DC current loop, then control the test switches to selectively cause a second and different current value to flow through at least one of the current shunts and the DC current loop, and measure a second and different voltage drop value across the sense resistor while the second current value is flowing through the DC current loop, and then select the Vth value based on a relationship between the first and second voltage drop values and the values of the first and second test currents; and perform the following steps while the PSU power output is connected to the transformer by the output power switch with each of the test switches controlled to disconnect its respective test current path through the current shunt and the DC current loop:
monitor the voltage drop across the sense resistor while the PSU is supplying DC output power through the DC current loop to the PSU power output and a power-consuming load with the PSU power output being connected to the transformer by the output power switch,
compare the selected Vth value to the monitored voltage drop across the sense resistor while the DC output power is flowing across the sense resistor, and
controlling the output power switch to disconnect the PSU power output from the transformer if the monitored voltage drop across the sense resistor is greater than the selected Vth.

18. The method of claim 11, further comprising using the at least one programmable integrated circuit to perform the following steps upon each power up cycle of the PSU:
first control the output power switch to disconnect the PSU power output from the transformer before supplying any direct current (DC) power to the PSU power output through the DC current loop paths of the DC output current loop;
then control the PSU to supply DC power from the secondary side of the transformer to produce a test current through the test current path;
monitor a voltage drop across the sense resistor while the test current is flowing across the sense resistor with the PSU power output being disconnected from the transformer by the output power switch;
compare the expected voltage drop to the monitored voltage drop across the sense resistor while the test current is flowing across the sense resistor, and
control the output power switch to connect the PSU power output to the transformer while the secondary side of the transformer is supplying power to the DC output current loop only if the monitored voltage drop across the sense resistor is equal to the expected voltage drop.

19. A method of operating a power supply unit (PSU) system including primary side circuitry and secondary side circuitry that are separated by a transformer, the method comprising:
receiving a power input in the primary side circuitry of the PSU, the primary side circuitry of the PSU including a primary side winding of the transformer;
receiving power in the secondary side circuitry from the primary side circuitry, the secondary side circuitry including the secondary side winding of the transformer coupled to a DC output current loop that includes first and second DC current loop paths and an output power switch coupled within the DC output current loop between the transformer and a PSU power output;
using at least one programmable integrated circuit to control the output power switch coupled within the DC output current loop between the transformer and the PSU power output to selectively connect and disconnect the PSU power output from the transformer;
using at least one programmable integrated circuit to monitor a voltage drop across a sense resistor coupled within one of the first or second DC current loop paths between the transformer and the output power switch while controlling the PSU to supply a DC output power through the DC current loop to the PSU power output while the PSU power output is selectively connected to the transformer by the output power switch; and
using the at least one programmed integrated circuit to:
monitor the DC output power supplied through the DC current loop to the PSU power output and determine an expected voltage drop across the sense resistor that corresponds to a value of the monitored DC output power,
monitor a voltage drop across the sense resistor while the monitored DC output power is supplied through the DC current loop to the PSU power output,
compare the expected voltage drop to the monitored voltage drop across the sense resistor while the monitored DC output power is supplied through the DC current loop to the PSU power output,
control the output power switch to disconnect the PSU power output to the transformer if the monitored voltage drop does not equal the expected voltage drop, and
control the output power switch to maintain the PSU power output connected to the transformer if the monitored voltage drop equals the expected voltage drop.

20. The method of claim 19, further comprising:
using a first programmable integrated circuit of the primary side circuitry to cause the transformer to supply the DC output power through the DC current loop to the PSU power output and to monitor the value of the DC output power supplied through the DC current loop to the PSU power output;
using a second programmable integrated circuit programmed of the secondary side circuitry to monitor the voltage drop across the sense resistor and to control the output power switch to selectively connect and disconnect the PSU power output from the transformer, the second programmable integrated circuitry being communicatively coupled to the first programmable integrated circuit; and
using the second programmable integrated circuit to:
receive from the first programmable integrated circuit a value of the monitored DC output power supplied through the DC current loop to the PSU power output,
determine the expected voltage drop across the sense resistor that corresponds to the value of the monitored DC output power,
monitor the voltage drop across the sense resistor while the monitored DC output power is supplied through the DC current loop to the PSU power output,
compare the expected voltage drop to the monitored voltage drop across the sense resistor while the monitored DC output power is supplied through the DC current loop to the PSU power output,
control the output power switch to disconnect the PSU power output from the transformer if the monitored voltage drop does not equal the expected voltage drop, and
control the output power switch to maintain the PSU power output connected to the transformer if the monitored voltage drop equals the expected voltage drop.

* * * * *